(No Model.)

J. NELSON.
ANIMAL TRAP.

No. 502,986. Patented Aug. 8, 1893.

WITNESSES:
F. McArdle
C. Sedgwick

INVENTOR
J. Nelson
BY Munn & Co.
ATTORNEYS.

UNITED STATES PATENT OFFICE.

JOSEPH NELSON, OF NAUVOO, ILLINOIS.

ANIMAL-TRAP.

SPECIFICATION forming part of Letters Patent No. 502,986, dated August 8, 1893.

Application filed April 12, 1893. Serial No. 470,014. (No model.)

*To all whom it may concern:*

Be it known that I, JOSEPH NELSON, of Nauvoo, in the county of Hancock and State of Illinois, have invented a new and Improved Trap, of which the following is a full, clear, and exact description.

My invention relates to improvements in animal traps; and the objects of my invention are to produce a very cheap and simple trap which may be readily set and easily sprung, also to produce a trap which is especially adapted for catching small animals such as rats, mice, squirrels, &c.; and further, to produce a trap which an animal will enter without suspicion and from which it is impossible to escape.

To these ends my invention consists in certain features of construction and combinations of parts, as will be hereinafter described and claimed.

Reference is to be had to the accompanying drawings forming a part of this specification, in which similar figures of reference indicate corresponding parts in both the views.

Figure 1:
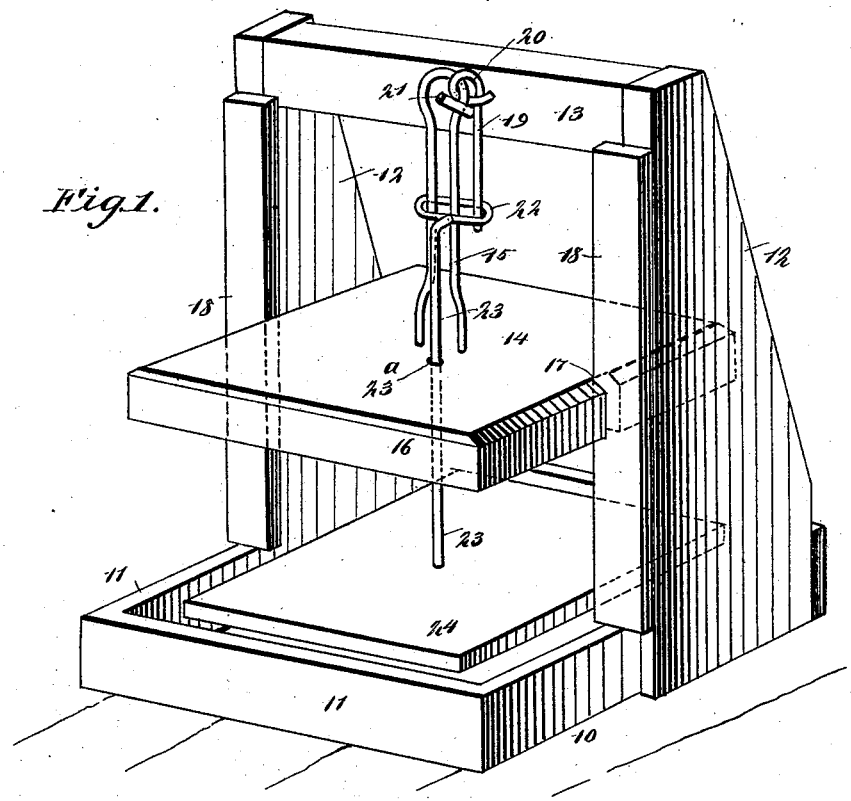
Figure 2:
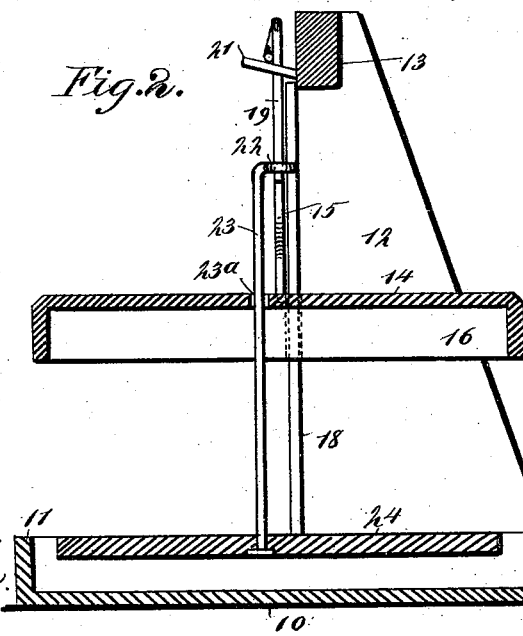

Figure 1 is a perspective view of the trap embodying my invention; and Fig. 2 is a central cross section of the same, the trap in both figures being shown set ready for use.

The trap is provided with a suitable base 10 which has vertical flanges 11 extending around it, and the tripping platform is adapted to settle down into the base as well also as the weight which catches the animal and which will be hereinafter described. Extending upward from the base on opposite sides, are side pieces 12 which are connected at the top by a cross piece 13, and a frame is thus formed which acts as a guide for the trap weight, as hereinafter further described.

The trap is provided with a vertically movable weight 14 which is heavy enough to drop upon an animal and pin him to the base so as to prevent his escape, and this weight is provided with a supporting bail 15 which enables it to be set and, as illustrated, the weight has depending flanges 16 on its edges so that when dropped upon an animal, it will not squeeze him to death but will catch him alive. It will be understood, however, that a plain weight may be used which, when dropped, will kill the animal outright. The weight 14 is slotted on the sides, as shown at 17, and projecting into these slots are the vertical guides 18 which are secured to the frame 12 and form practically a part thereof, and this arrangement causes the weight to keep its position and to slide easily in a vertical direction. The bail 15 has pivoted to its upper end, as shown at 20, a locking arm 19 which is adapted to be swung over a pin 21 on the cross bar 13 and to extend downward parallel with the bail and into a loop 22 which embraces the bail and slides thereon, this loop being formed on the upper end of the suspending rod 23 which projects downward through a hole 23ª in the center of the weight 14, and this rod supports the tripping platform 24 which, when the trap is set, hangs parallel with the weight 14 and about level with the top of the flanges 11 of the base, as illustrated best in Fig. 2, although it is in some cases best to hang it lower.

To set the trap, the weight 14 is raised, the arm 19 is swung over the pin 21, as shown in Fig. 1, and made to extend parallel with the bail 15, after which the tripping platform 24 is raised so that the lower end of the arm 19 enters the loop 22. The weight 14 will press downward with sufficient force to throw the lower end of the arm 19 outward and the friction of the arm on the loop 22 supports the platform 24.

When the trap is set, a suitable bait is placed upon the platform, and the animal steps upon the platform to get the bait and his weight depresses the platform so as to pull the loop 22 off the locking arm 19, and the weight 14 being thus freed immediately descends upon the animal and fastens him beneath it.

It will be understood that the trap may be made with a number of tripping platforms and with a weight for each platform if desired, without affecting the principle of the invention, and a spring may also be used for forcing down the weight 14 or an equivalent plate.

Having thus described my invention, I claim as new and desire to secure by Letters Patent—

1. A trap, comprising a vertically movable weight held to slide between suitable guides, and provided with an upwardly extending bail having a locking arm pivoted thereon, a stationary pin supported at one side of the bail, a tripping platform arranged beneath the weight and having a suspending rod extending upward through the weight, and a loop formed on the suspending rod and arranged to embrace the bail and engage the locking arm, substantially as described.

2. A trap, comprising a base, a guide frame extending upward from the base, a vertically movable weight held to slide in the guide frame, a bail extending upward from the weight and provided with a pivoted locking arm at the top, a stationary pin projecting from the frame near the bail, a tripping platform arranged to move vertically beneath the weight, a suspending rod extending upward from the platform through the weight, and a loop formed on the suspending rod and embracing the bail, substantially as described.

3. The combination with the frame having a supporting pin, a vertically sliding weight and a supporting and locking mechanism carried by the weight and engaging said pin to hold the weight raised, of a vertically movable platform under the weight and upon which the animal steps to release the weight and cause it to crush it upon the platform, and a releasing and supporting device carried by the platform, engaging the weight supporting and locking mechanism, and holding the same locked, and also releasing it when the platform is depressed by the weight of an animal thereon, substantially as set forth.

4. A trap, comprising a base having upwardly extending flanges thereon, a guide frame projecting upward from the base, a weight held to slide vertically in the guide frame, a bail projecting upward from the weight, a locking arm pivoted on the bail, a pin secured to the frame near the bail, a vertically movable tripping platform arranged beneath the weight, a suspending rod secured to the platform and extending upward through the weight, and a loop formed on the suspending rod and arranged to embrace the bail and engage the locking arm, substantially as described.

JOSEPH NELSON.

Witnesses:
J. A. BORTZ,
WM. RAPP, Jr.